(12) United States Patent
Zhang et al.

(10) Patent No.: US 8,879,207 B1
(45) Date of Patent: Nov. 4, 2014

(54) METHOD FOR PROVIDING A SIDE SHIELD FOR A MAGNETIC RECORDING TRANSDUCER USING AN AIR BRIDGE

(71) Applicant: Western Digital (Fremont), LLC, Fremont, CA (US)

(72) Inventors: Jinqiu Zhang, Fremont, CA (US); Feng Liu, San Ramon, CA (US); Shaoping Li, San Ramon, CA (US); Ming Sun, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/887,252

(22) Filed: May 3, 2013

Related U.S. Application Data

(62) Division of application No. 13/331,208, filed on Dec. 20, 2011, now Pat. No. 8,451,563.

(51) Int. Cl.
*G11B 5/127* (2006.01)
*G11B 5/11* (2006.01)

(52) U.S. Cl.
CPC ................................ *G11B 5/112* (2013.01)
USPC ...................................................... 360/125.3

(58) Field of Classification Search
USPC ............... 360/125.3, 125.03, 125.09, 125.04, 360/125.17, 125.12, 125.16, 125.06, 360/125.15, 125.26, 125.02, 125.31, 360/125.13, 125.23, 125.07
See application file for complete search history.

(56) References Cited

U.S. PATENT DOCUMENTS

| | | |
|---|---|---|
| 4,843,023 A | 6/1989 | Chiu et al. |
| 5,498,898 A | 3/1996 | Kawamura |
| 5,640,032 A | 6/1997 | Tomioka |
| 5,672,526 A | 9/1997 | Kawamura |
| 5,898,541 A | 4/1999 | Boutaghou et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

OTHER PUBLICATIONS

Notice of Allowance dated Jan. 30, 2013 from U.S. Appl. No. 13/331,208, 9 pages.

*Primary Examiner* — Allen T Cao

(57) ABSTRACT

A method fabricates a side shield for a magnetic transducer having a nonmagnetic layer and an ABS location corresponding to an ABS. The nonmagnetic layer has a pole trench therein. The pole trench has a shape and location corresponding to the pole. A wet etchable layer is deposited. Part of the wet etchable layer resides in the pole trench. A pole is formed. The pole has a bottom and a top wider than the bottom in the pole tip region. Part of the pole in the pole tip region is in the pole trench on at least part of the wet etchable layer. At least parts of the wet etchable layer and the nonmagnetic layer are removed, forming an air bridge. The air bridge is between part of the pole at the ABS location and an underlying layer. Side shield layer(s) that substantially fill the air bridge are deposited.

3 Claims, 11 Drawing Sheets

(56) References Cited

U.S. PATENT DOCUMENTS

| | | | |
|---|---|---|---|
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,936 B1 | 10/2001 | Kant et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,489,177 B1 | 12/2002 | Inomoto |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |

(56) References Cited

U.S. PATENT DOCUMENTS

| | | |
|---|---|---|
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,231 B2 | 5/2004 | Arya et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,949,833 B2 | 9/2005 | O'Kane et al. |
| 6,950,266 B1 | 9/2005 | McCaslin et al. |
| 6,954,332 B1 | 10/2005 | Hong et al. |
| 6,954,340 B2 | 10/2005 | Shukh et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,980,403 B2 | 12/2005 | Hasegawa |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,042,682 B2 | 5/2006 | Hu et al. |
| 7,046,490 B1 | 5/2006 | Ueno et al. |
| 7,050,270 B1 | 5/2006 | Oveyssi et al. |
| 7,054,113 B1 | 5/2006 | Seagle et al. |
| 7,057,857 B1 | 6/2006 | Niu et al. |
| 7,059,868 B1 | 6/2006 | Yan |
| 7,067,066 B2 | 6/2006 | Sasaki et al. |
| 7,070,698 B2 | 7/2006 | Le |
| 7,075,756 B1 | 7/2006 | Mallary et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,498 B2 | 10/2006 | Sato |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,239,479 B2 | 7/2007 | Sasaki et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,295,401 B2 | 11/2007 | Jayasekara et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,322,095 B2 | 1/2008 | Guan et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |

(56) References Cited

U.S. PATENT DOCUMENTS

| | | | |
|---|---|---|---|
| 7,363,697 B1 | 4/2008 | Dunn et al. |
| 7,367,112 B2 | 5/2008 | Nix et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,525,769 B2 | 4/2009 | Yao et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,565,732 B2 | 7/2009 | Le et al. |
| 7,576,951 B2 | 8/2009 | Allen et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,158 B1 | 3/2010 | Lauer |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,898,773 B2 | 3/2011 | Han et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,978,438 B2 | 7/2011 | Ohta et al. |
| 7,982,989 B1 | 7/2011 | Shi et al. |
| 8,000,059 B2 | 8/2011 | Jiang et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,051,552 B2 | 11/2011 | Jiang et al. |
| 8,065,787 B2 | 11/2011 | Sasaki et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,120,874 B2 | 2/2012 | Hsiao et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,137,570 B2 | 3/2012 | Le |
| 8,141,235 B1 | 3/2012 | Zhang |
| 8,146,236 B1 | 4/2012 | Luo et al. |
| 8,149,536 B1 | 4/2012 | Yang et al. |
| 8,149,537 B2 | 4/2012 | Nazarov |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,201,320 B2 | 6/2012 | Allen et al. |
| 8,201,321 B2 | 6/2012 | Matono et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,252,190 B2 * | 8/2012 | Pentek et al. ................ 216/22 |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,562 B2 * | 10/2012 | Gao et al. .................... 360/319 |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,300,359 B2 | 10/2012 | Hirata et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |

(56) References Cited

U.S. PATENT DOCUMENTS

| | | | |
|---|---|---|---|
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,349,197 B2* | 1/2013 | Hong et al. ............ 216/22 |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,400,733 B2* | 3/2013 | Shin et al. ............ 360/125.15 |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,660 B2* | 10/2013 | Allen et al. ............ 360/125.13 |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2002/0071208 A1 | 6/2002 | Batra et al. |
| 2005/0057852 A1 | 3/2005 | Yazawa et al. |
| 2005/0068669 A1 | 3/2005 | Hsu et al. |
| 2005/0128637 A1 | 6/2005 | Johnston et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0115584 A1 | 5/2007 | Balamane et al. |
| 2007/0146929 A1 | 6/2007 | Maruyama et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0211384 A1 | 9/2007 | Hsiao et al. |
| 2007/0217069 A1 | 9/2007 | Okada et al. |
| 2007/0223144 A1 | 9/2007 | Yao et al. |
| 2007/0245545 A1 | 10/2007 | Pentek et al. |
| 2007/0253107 A1 | 11/2007 | Mochizuki et al. |
| 2007/0268626 A1 | 11/2007 | Taguchi et al. |
| 2008/0100959 A1 | 5/2008 | Feldbaum et al. |
| 2008/0110761 A1 | 5/2008 | Lam et al. |
| 2008/0113090 A1 | 5/2008 | Lam et al. |
| 2008/0148552 A1 | 6/2008 | Pentek et al. |
| 2008/0278861 A1 | 11/2008 | Jiang et al. |
| 2008/0297945 A1 | 12/2008 | Han et al. |

(56) References Cited

U.S. PATENT DOCUMENTS

| | | |
|---|---|---|
| 2008/0313885 A1 | 12/2008 | Hsiao et al. |
| 2009/0002885 A1 | 1/2009 | Sin |
| 2009/0034128 A1 | 2/2009 | Sharma et al. |
| 2009/0116145 A1 | 5/2009 | Guan et al. |
| 2009/0128952 A1 | 5/2009 | Sato et al. |
| 2009/0128953 A1* | 5/2009 | Jiang et al. ............... 360/125.02 |
| 2009/0168236 A1 | 7/2009 | Jiang et al. |
| 2009/0168242 A1 | 7/2009 | Liu |
| 2009/0184091 A1 | 7/2009 | Zheng |
| 2009/0195920 A1 | 8/2009 | Bonhote et al. |
| 2010/0155364 A1 | 6/2010 | Pentek et al. |
| 2010/0155367 A1* | 6/2010 | Pentek et al. .................... 216/22 |
| 2010/0290157 A1 | 11/2010 | Zhang et al. |
| 2011/0086240 A1 | 4/2011 | Xiang et al. |
| 2011/0097601 A1 | 4/2011 | Bai et al. |
| 2011/0120878 A1 | 5/2011 | Hong et al. |
| 2011/0147222 A1 | 6/2011 | Pentek et al. |
| 2011/0228425 A1 | 9/2011 | Liu et al. |
| 2011/0255196 A1 | 10/2011 | Wu et al. |
| 2012/0111826 A1 | 5/2012 | Chen et al. |
| 2012/0125886 A1* | 5/2012 | Hong et al. ..................... 216/22 |
| 2012/0127612 A1* | 5/2012 | Shin et al. ................ 360/123.12 |
| 2012/0140358 A1 | 6/2012 | Sasaki et al. |
| 2012/0147499 A1 | 6/2012 | Sasaki et al. |
| 2012/0147501 A1 | 6/2012 | Sasaki et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0304454 A1 | 12/2012 | Jiang et al. |
| 2013/0022841 A1* | 1/2013 | Gao et al. .................... 428/815.2 |
| 2013/0216702 A1 | 8/2013 | Kaiser et al. |
| 2013/0216863 A1 | 8/2013 | Li et al. |
| 2013/0242431 A1* | 9/2013 | Hosomi et al. ........... 360/119.02 |
| 2013/0257421 A1 | 10/2013 | Shang et al. |
| 2014/0063657 A1* | 3/2014 | Gao et al. ................. 360/119.02 |

* cited by examiner

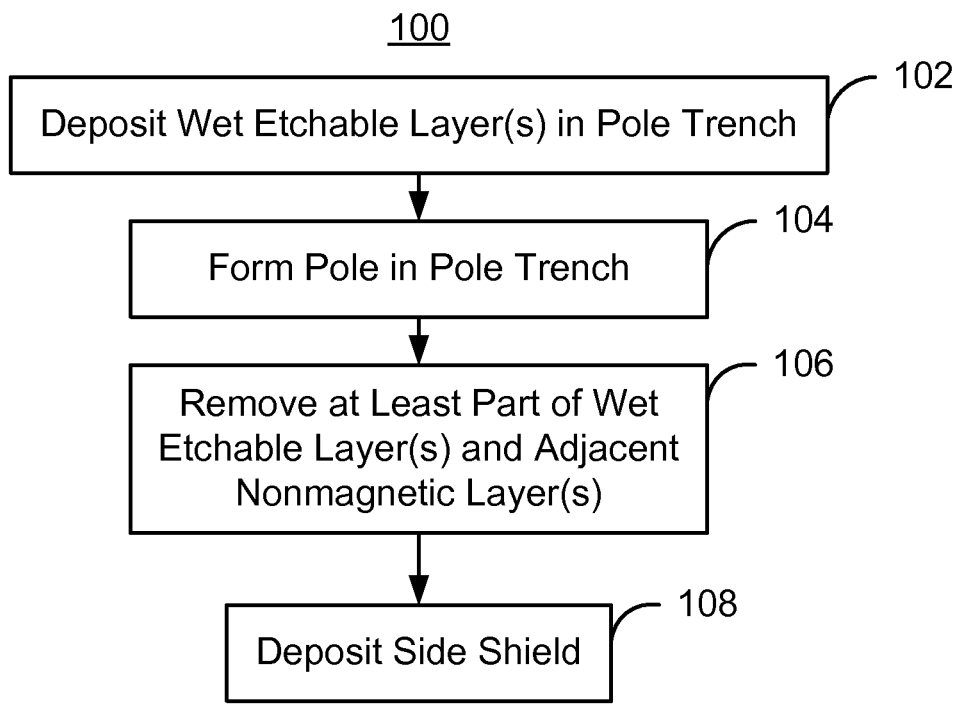
FIG. 3
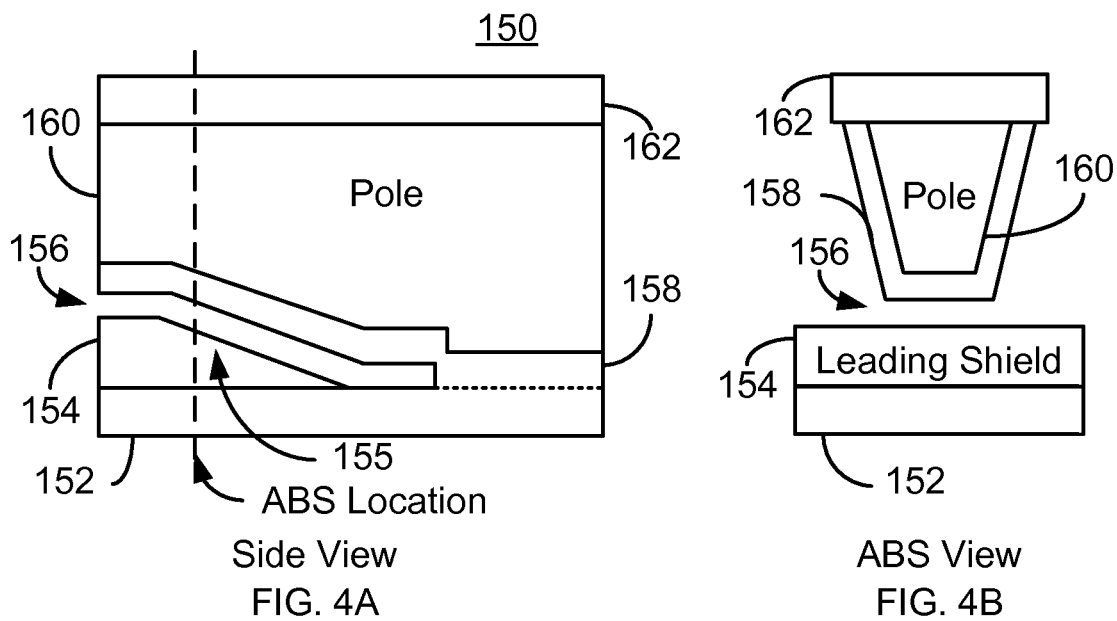
Side View
FIG. 4A
ABS View
FIG. 4B

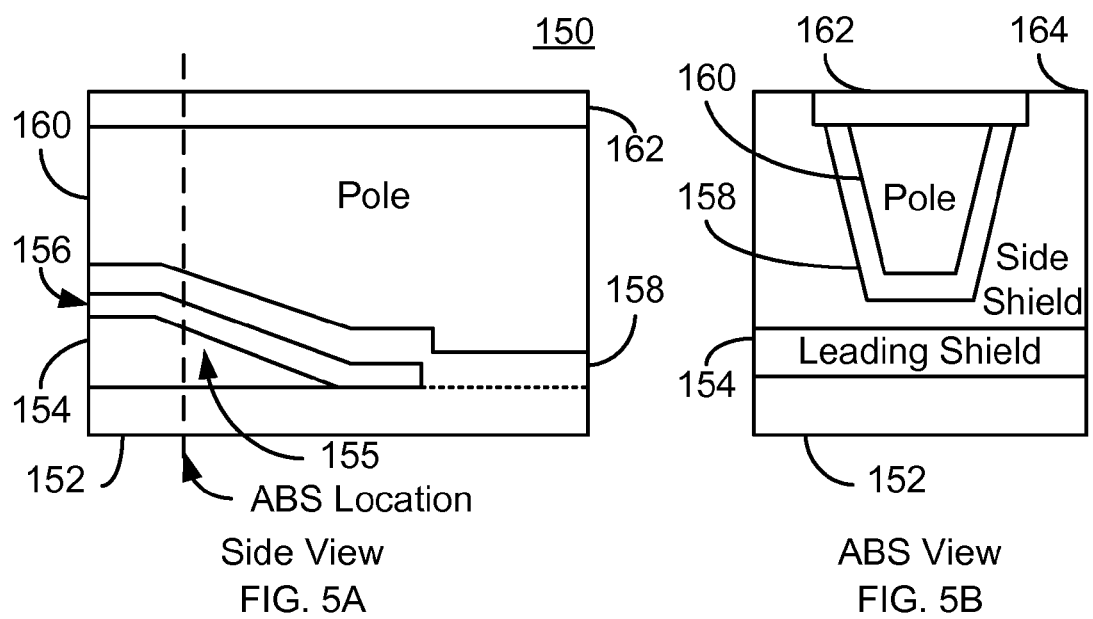

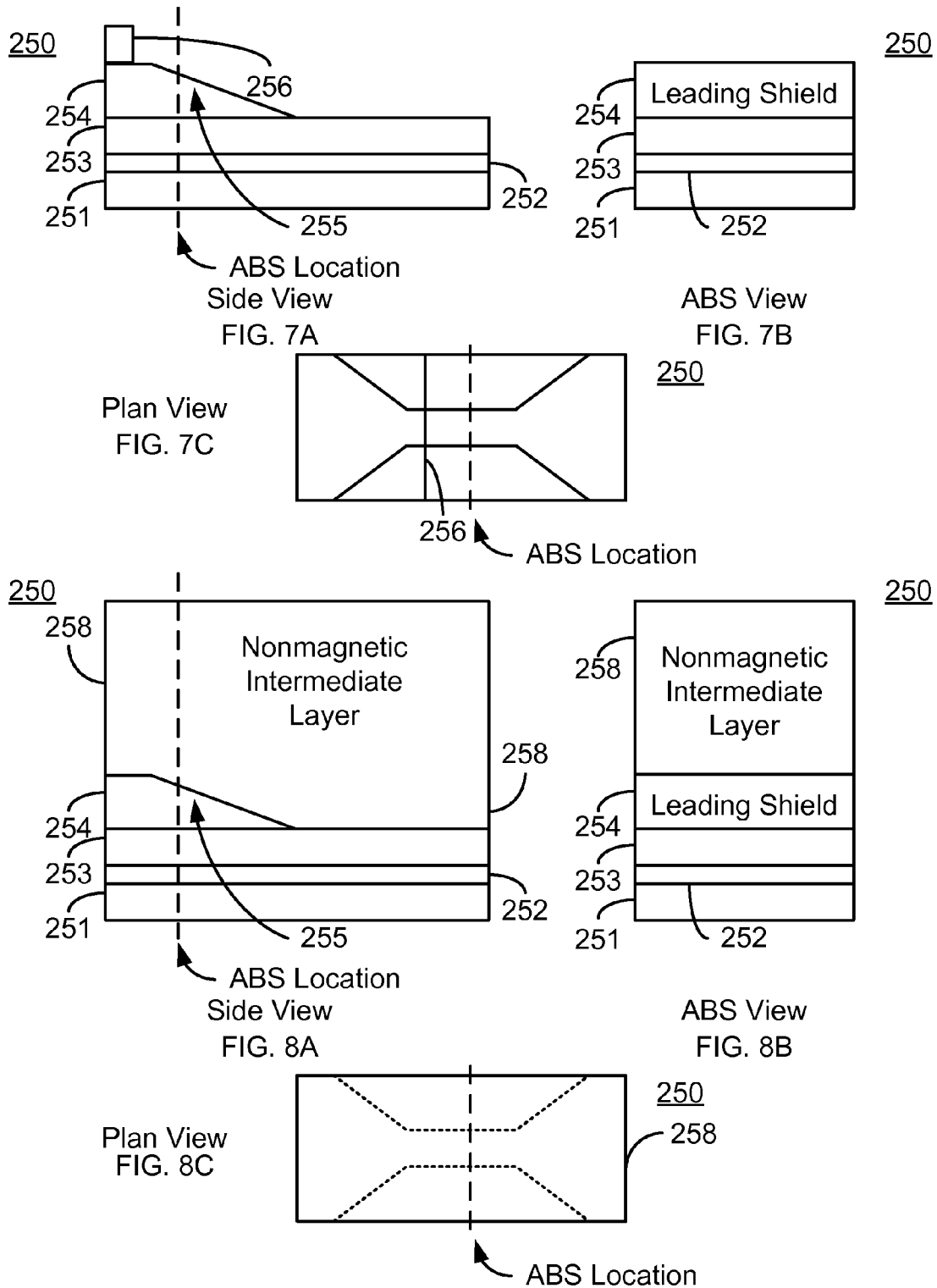

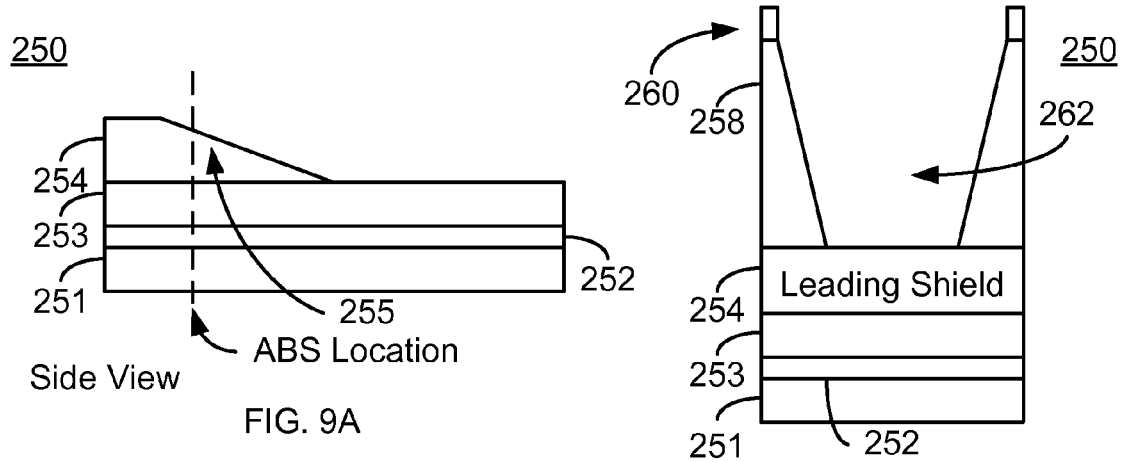
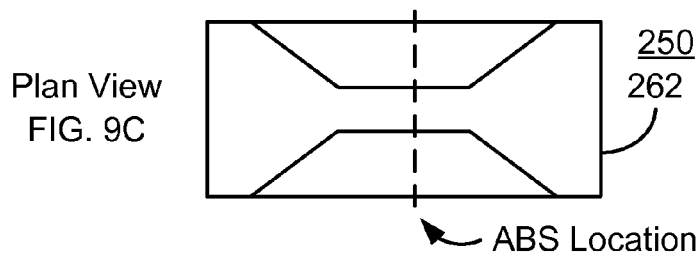
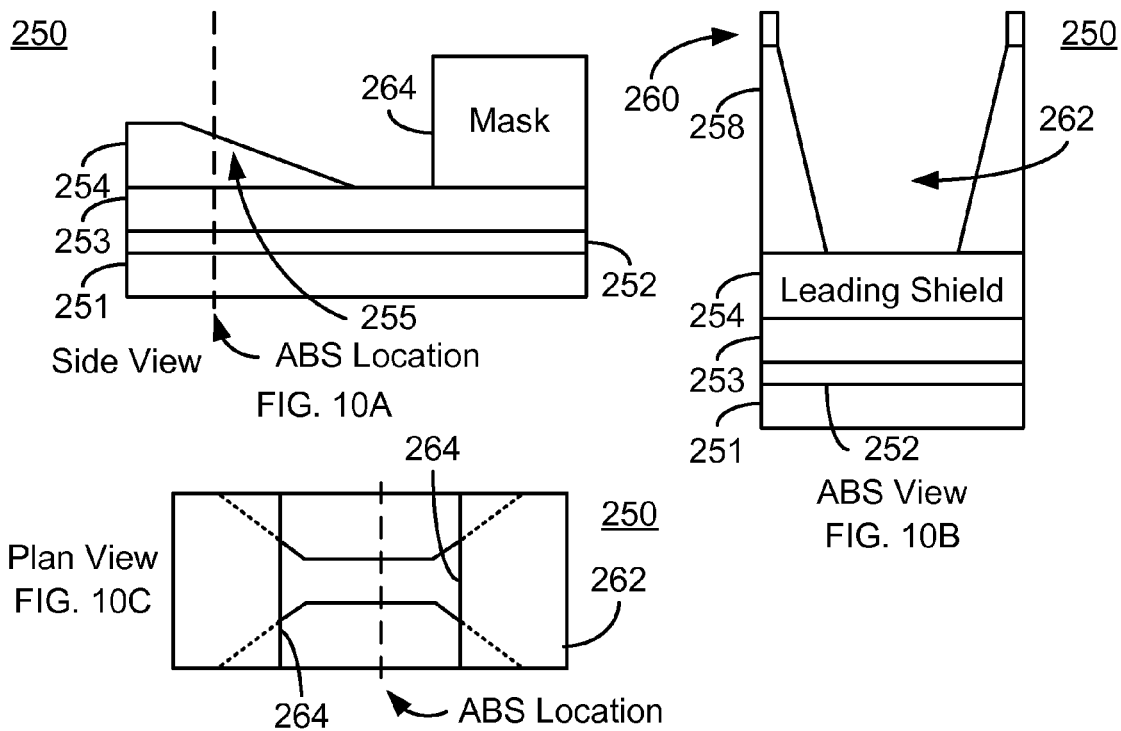

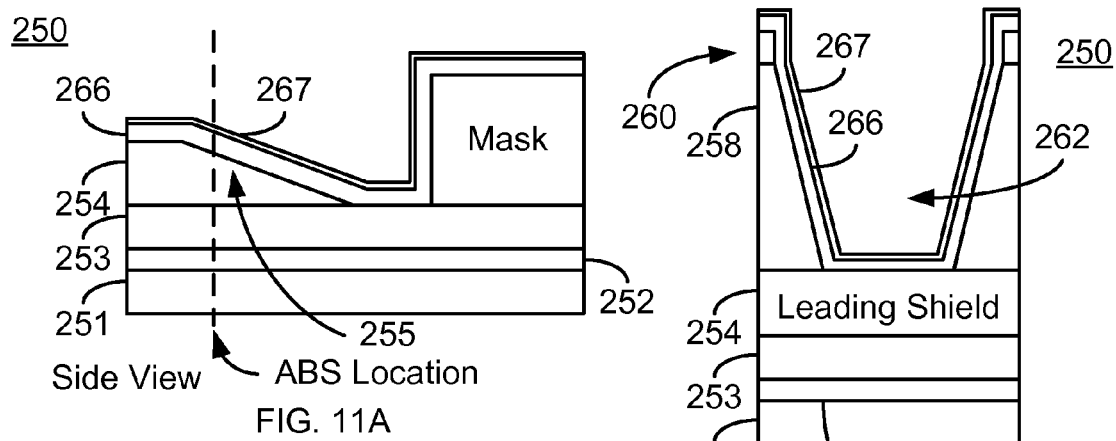
FIG. 11A Side View
FIG. 11B ABS View
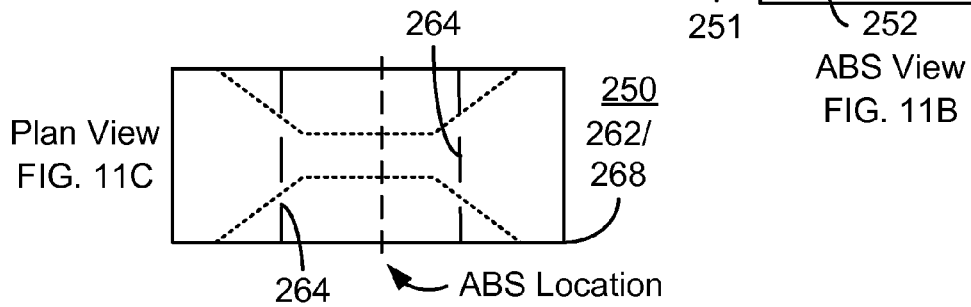
FIG. 11C Plan View
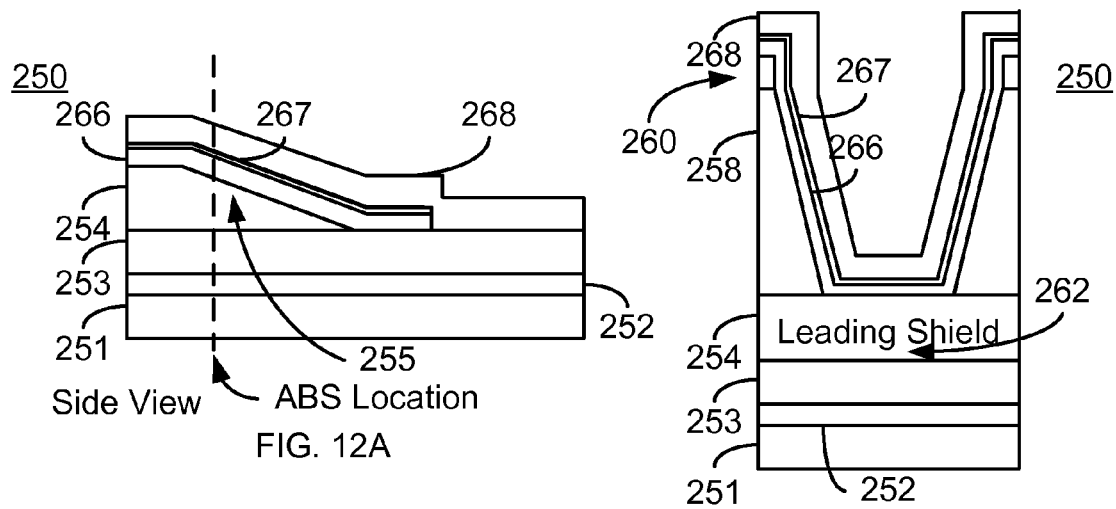
FIG. 12A Side View
FIG. 12B ABS View
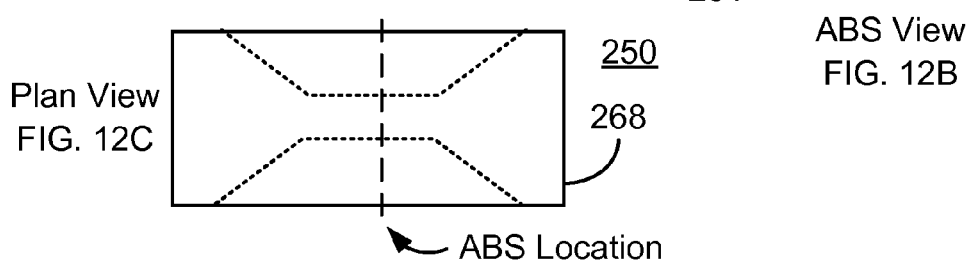
FIG. 12C Plan View

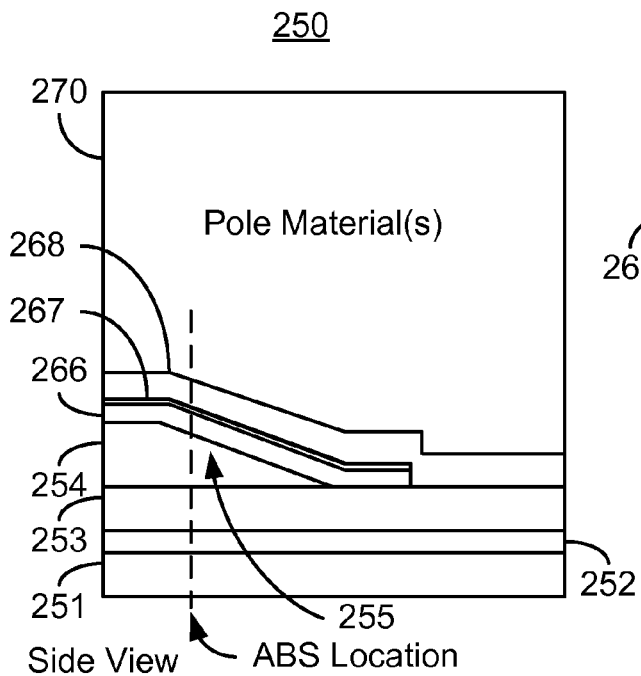
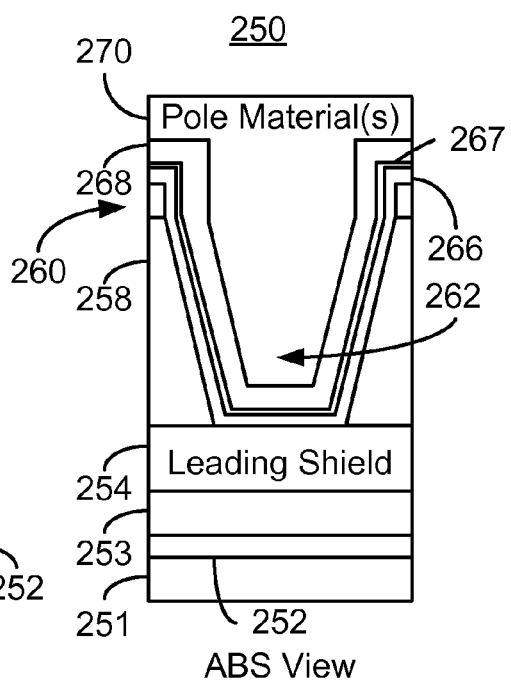
FIG. 13A
FIG. 13B
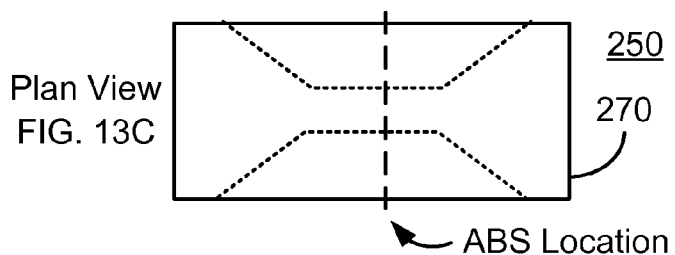
FIG. 13C

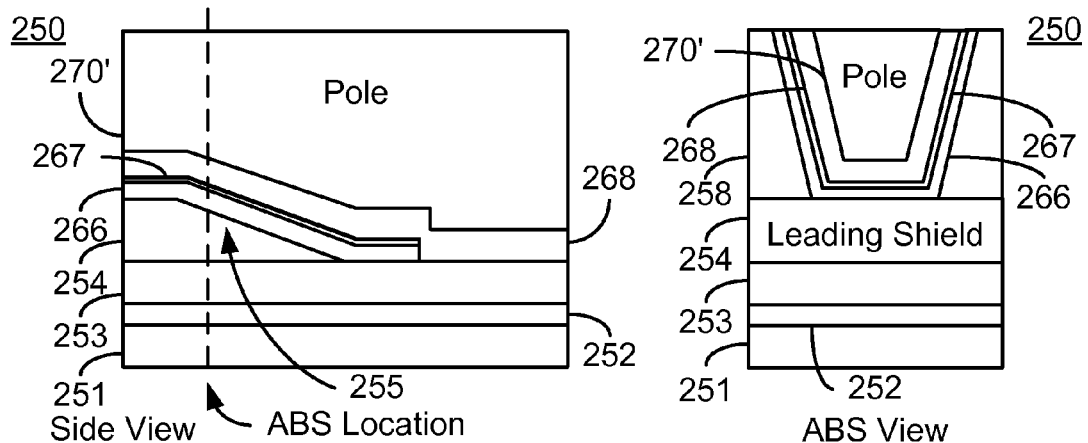
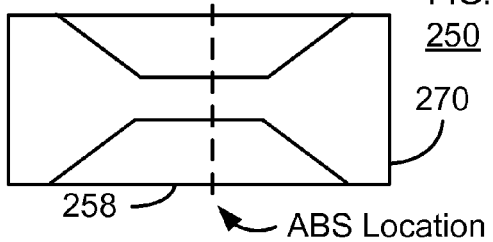
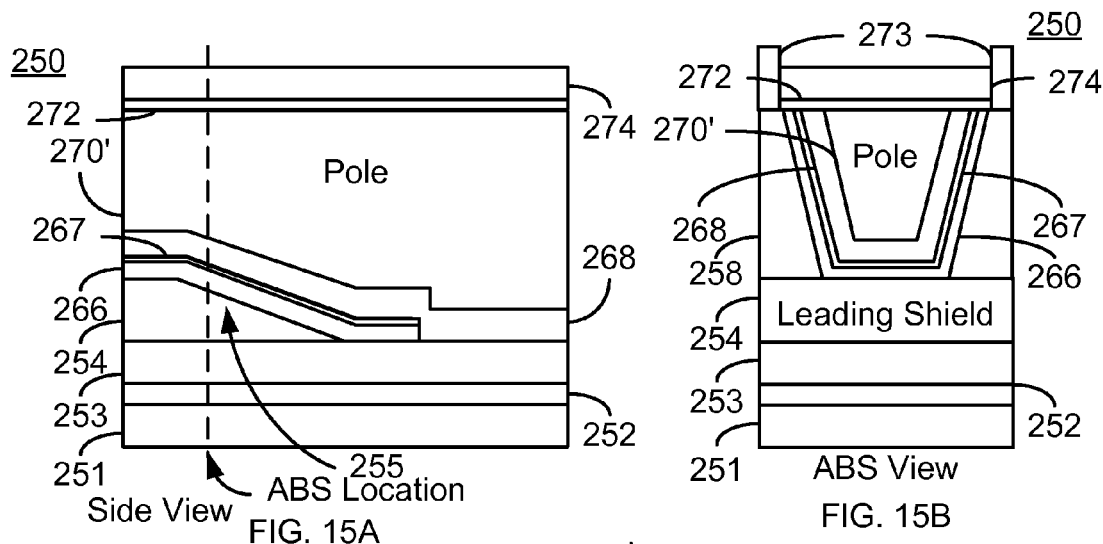
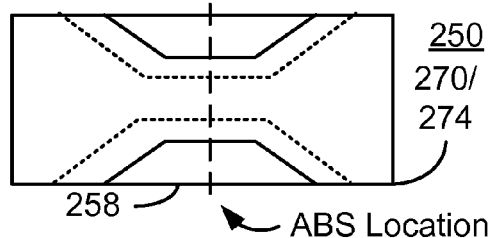

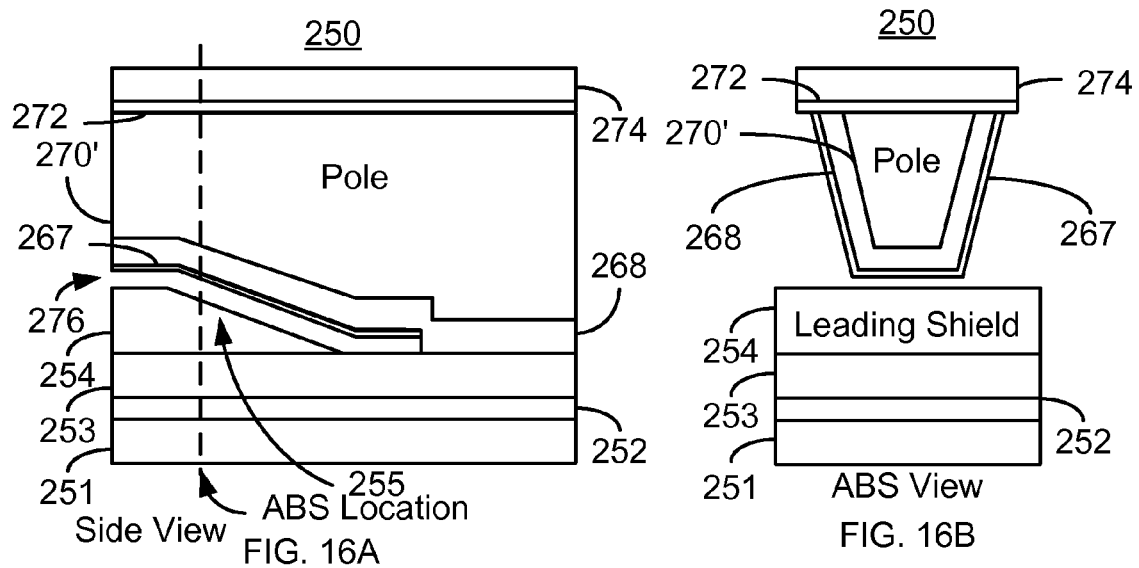
Side View
FIG. 16A
ABS View
FIG. 16B
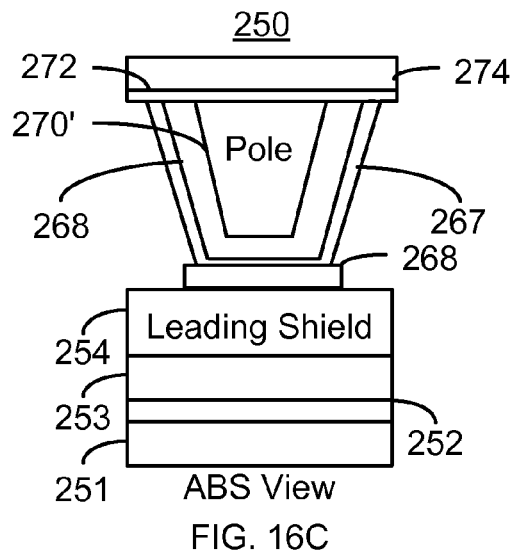
ABS View
FIG. 16C
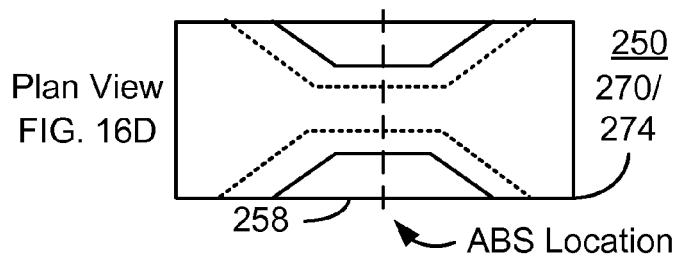
Plan View
FIG. 16D

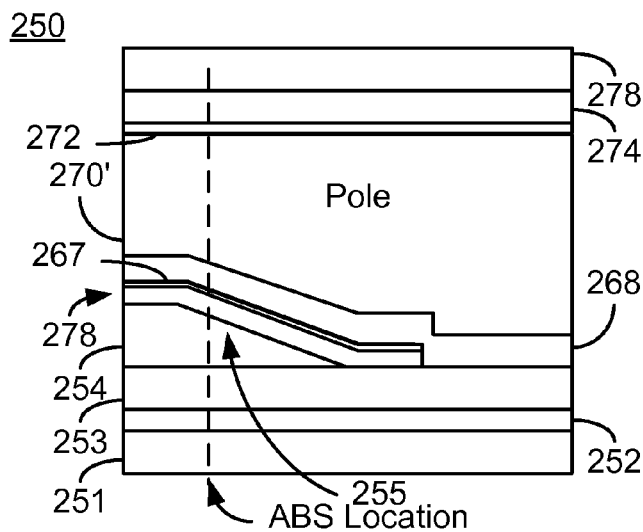
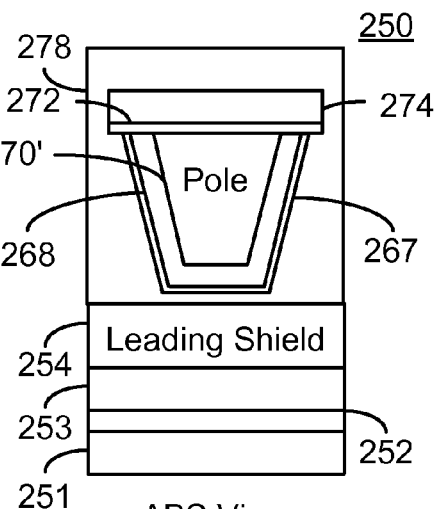
Side View
FIG. 17A
ABS View
FIG. 17B
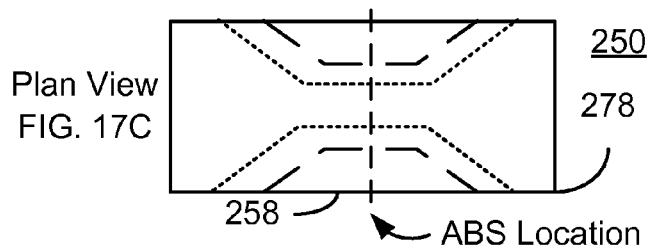
Plan View
FIG. 17C
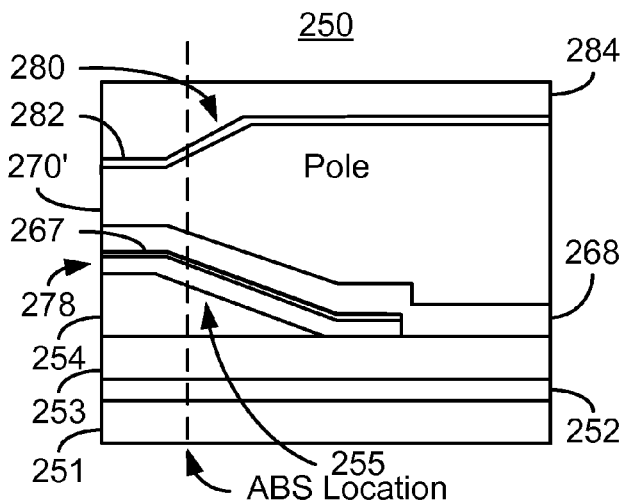
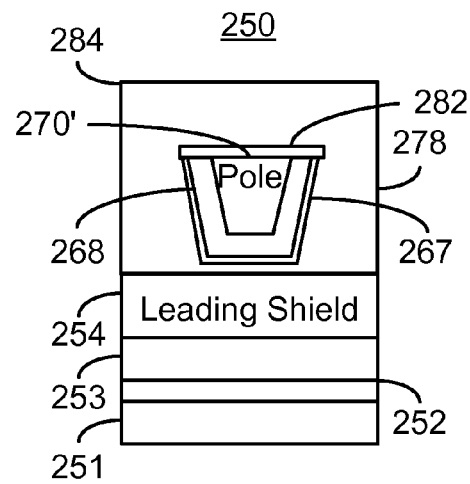
Side View
FIG. 18A
ABS View
FIG. 18B

METHOD FOR PROVIDING A SIDE SHIELD FOR A MAGNETIC RECORDING TRANSDUCER USING AN AIR BRIDGE

CROSS-REFERENCE TO RELATED APPLICATIONS

This application is a divisional of U.S. patent application Ser. No. 13/331,208, filed on Dec. 20, 2011, which is hereby incorporated by reference in its entirety.

BACKGROUND

FIG. 1 is a flow chart depicting a conventional method 10 for fabricating for a conventional magnetic recording transducer including side shields. For simplicity, some steps are omitted. Prior to the conventional method 10 starting, underlayers such as a leading edge shield may be formed. The conventional method 10 typically starts by providing a pole, such as a perpendicular magnetic recording (PMR) pole, via step 12. Step 12 includes fabricating the pole in a nonmagnetic layer, such as aluminum oxide. For example, a damascene process that forms a trench in the aluminum oxide layer, deposits nonmagnetic side gap/seed layers, and deposits magnetic pole layers may be used. In addition, the portion of the magnetic material external to the trench may be removed, for example using a chemical mechanical planarization (CMP) process.

The exposed aluminum oxide is wet etched, via step 14. Thus, a trench is formed around a portion of the pole near the ABS location. Note that side gap layers may remain after the aluminum oxide etch in step 14. The removal of the aluminum oxide in step 14 exposes the top surface of the leading edge shield. The side shields are deposited, via step 16. Step 16 may include depositing seed layers and plating the side shields. Processing may then be completed, via step 18. For example, a trailing edge shield and gap may be formed.

FIG. 2 depicts plan and air-bearing surface (ABS) views of a portion of a conventional transducer 50 formed using the conventional method 10. The conventional transducer 50 includes a leading edge shield 52, side shield 54, Ru side gap layer 56 which is deposited in the trench, a pole 58, top gap layer 60, and trailing shield 62. Thus, using the conventional method 10, the pole 58, side shields 54, and trailing shield 62 may be formed.

Although the conventional method 10 may provide the conventional transducer 50, there may be drawbacks. The performance of the conventional transducer 50 may be compromised. In particular, fabrication using the method 10 may result in an interface 53 between the leading shield 52 and the side shields 54. The side shield 54 thus has corners at which field may nucleate. As a result of the side shield corner fields, the media (not shown) may undergo unexpected erasures. Further, the interface 53 may be rough, not sufficiently clean, or otherwise less than ideal due to the wet etch performed in step 14. There may also be other layers, including seed layer(s) between the leading shield 52 and the side shield 54. These additional layers may further degrade performance of the side shield 54.

Accordingly, what is needed is an improved method for fabricating a transducer.

SUMMARY

A method fabricates a side shield for a magnetic transducer. The magnetic transducer has a nonmagnetic layer and an air-bearing surface location (ABS location) corresponding to an air-bearing surface (ABS). The nonmagnetic layer has a pole trench therein. The pole trench has a shape and location corresponding to the pole. A wet etchable layer is deposited. A portion of the wet etchable layer resides in the pole trench. A pole having a pole tip region is formed. The pole has a bottom and a top wider than the bottom in the pole tip region. A portion of the pole in the pole tip region is in the pole trench on at least a first portion of the wet etchable layer. At least a second portion of the wet etchable layer and a portion of the nonmagnetic layer are removed such that an air bridge is formed. The air bridge is between the portion of the pole at the ABS location and an underlying layer. At least one side shield layer is deposited. A portion of the side shield layer(s) substantially fills the air bridge. In one aspect, the side shield layer(s) are interface-free between the pole and the underlying layer.

BRIEF DESCRIPTION OF SEVERAL VIEWS OF THE DRAWINGS

FIG. 3 is a flow chart depicting an exemplary embodiment of a method for fabricating a magnetic recording transducer including side shields.

FIGS. 4A-B are diagrams depicting an exemplary embodiment of a magnetic transducer having side shields during fabrication.

FIGS. 5A-B are diagrams depicting an exemplary embodiment of a magnetic transducer having side shields.

FIGS. 7A-C-18A-18B are diagrams depicting side, ABS, and plan views an exemplary embodiment of a magnetic recording transducer during fabrication.

DETAILED DESCRIPTION OF THE PREFERRED EMBODIMENTS

Figure 1:
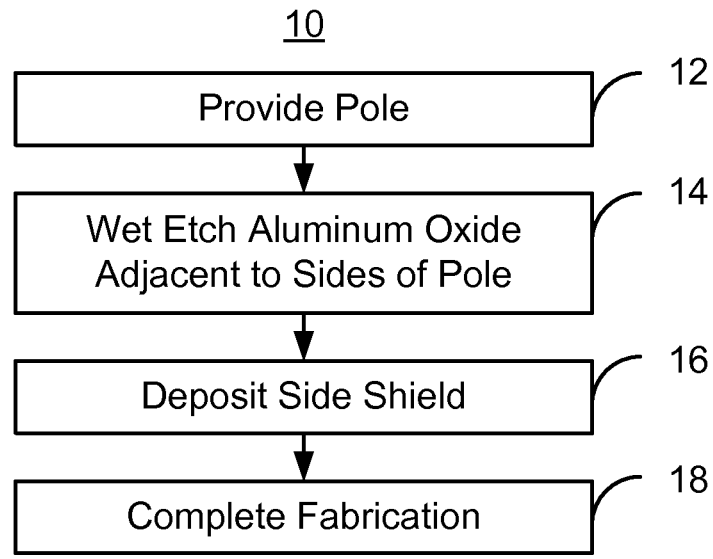
FIG. 1 is a flow chart depicting a conventional method for fabricating a magnetic recording transducer.
Figure 2:
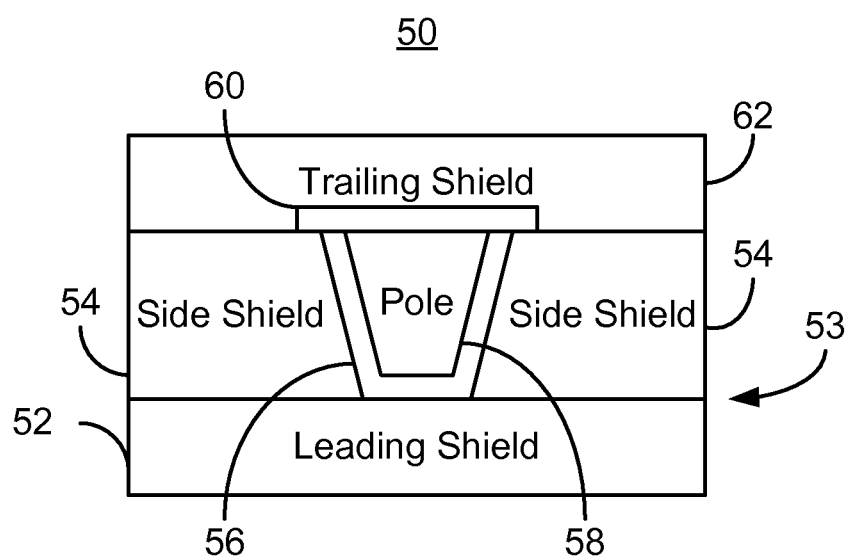
FIG. 2 is a diagram depicting an ABS view of a conventional magnetic transducer.

FIG. 3 is a flow chart depicting an exemplary embodiment of a method 100 for fabricating a transducer. The method 100 is may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 also may commence after formation of other portions of the PMR transducer. The method 100 is also described in the context of providing a single set of side shields and their associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the pole trench in a nonmagnetic intermediate layer. The pole trench has the shape and location of the pole to be formed. In some embodiments, the intermediate layer is an aluminum oxide layer. The nonmagnetic layer as well as the pole may reside on an underlayer. Further, in some embodiments, a leading edge shield is desired. In such embodiments, the leading edge shield may be considered part of the underlayer. The leading edge shield is generally ferromagnetic, magnetically soft, and may include materials such as NiFe. Further, an air-bearing surface location (ABS location) marks the surface at which the air-bearing surface (ABS) will reside. Finally, in some embodiments, the underlay(s) may be configured such that a bottom, or leading edge, bevel is formed.

At least one wet etchable layer is deposited after formation of the pole trench, via step 102. Thus, a portion of the wet etchable layer(s) is in the pole trench. In some embodiments, step 102 includes providing a mask that has a front edge recessed from the ABS location. The front edge corresponds to the back edge of the wet etchable layer. The back edge of the wet etchable layer may be desired to be within twenty nanometers from the back edge the side shields. Thus, the front edge of the mask may be within twenty nanometers of the desired back edge of the side shields. In some embodiments, the back edge of the wet etchable layer is desired to be aligned as closely as possible to the back edge of the side shield. Thus, the front edge of the mask may be aligned to the desired back edge of the side shields. The mask thus has an aperture that extends at least from the ABS location to the front edge of the mask. In some embodiments, in which the pole is formed with an anchor structure opposite to the pole from the ABS location, the aperture extends to a portion of the anchor structure. Once the mask is in place, the wet etchable layer is deposited. In some embodiments, the wet etchable layer is aluminum oxide. Step 102 may then include depositing the aluminum oxide layer using atomic layer deposition (ALD). In other embodiments, other materials and/or other deposition methods may be used. After the wet etchable layer has been deposited, the mask may be removed. Although described as a wet etchable layer, the layer deposited in step 102 may be removed by another method as long as the layer may be completed removed in the space between the pole (described below) and the underlying layer(s).

A pole having a pole tip region is formed, via step 104. Step 104 typically includes depositing seed and other layers as well as depositing high saturation magnetization materials for the pole. In some embodiments, step 104 includes plating the high saturation magnetization layers. Further, between steps 102 and 104 or as part of step 104, one or more wet etch stop layer(s) may be provided. In some embodiments, seed, adhesion, or other layers may be deposited as part of formation of the wet etch stop layer(s). In some embodiments, the pole has a bottom and a top wider than the bottom in the pole tip region. A portion of the pole in the pole tip region is in the pole trench and on at least a first portion of the wet etchable layer.

At least part of the wet etchable layer is removed, via step 106. In addition, a portion of the nonmagnetic layer adjacent to the sidewalls of the pole is also removed. In some embodiments, the wet etchable layer and nonmagnetic intermediate layer in which the pole trench is formed are the same material: aluminum oxide. In such embodiments, a single wet etch may remove the desired parts of both layers. However, in other embodiments, multiple wet etches including wet etches using different etch chemistries may be used. Further, other processes that are appropriate might also be used. Because some or all of the wet etchable layer is removed, an air bridge is formed between the portion of the pole in the pole tip region at the ABS location and an underlying layer, via step 106. The air bridge occupies the space under the pole in which the wet etchable layer had resided. In some embodiments, the wet etch performed in step 106 may also remove a portion of the underlying layer(s). Thus, the air bridge formed in step 106 may have a thickness of not more than one micron. In other embodiments, the air bridge may be only as thick as the wet etchable layer.

FIGS. 4A-4B depict a magnetic transducer 150 during formation using the method 100. In particular, side and ABS views are shown in FIGS. 4A and 4B, respectively. For clarity, FIGS. 4A-4B is not to scale. The magnetic transducer 150 may be part of a merged heat that includes at least one read transducer (not shown) in addition to at least one magnetic transducer 150. The magnetic transducer 150 includes an underlayer 152, and a bottom, or leading edge shield 154. In some embodiments, the leading edge shield 154 may be considered to be an underlayer. The leading edge shield 154 may also be omitted. The leading edge shield 154 is also shown as including a beveled surface 155 that corresponds to the bevel to be formed in the pole. Also shown are nonmagnetic layers 158 and 162. These layers are etch stop layers 158 and 162. Each etch stop layer 158 and 162 may include multiple sublayers. The etch stop layer 158 is shown as connecting to layer 152. In some embodiments, the layer 152 and 158 are formed of the same material, such as Ru. Thus, a dotted line is shown between the two layers 152 and 158. The pole 160 has also been formed. In the embodiment shown, the pole 160 includes a bevel corresponding to the beveled surface 155. However, in other embodiments, the pole 160 may not have a leading edge bevel. The wet etch stop layers 158 and 162 substantially surround the pole 160 in the pole tip region. Thus, the pole 160 may be protected from the etchant used in the wet etch step 106 of the method 100.

In addition, an air bridge 156 has been formed. The air bridge 156 exists between the bottom of the pole 160 and the underlying layers 152 and 154. In some embodiments, the wet etch of step 106 may also remove portions of the underlayer(s) 152 and 154. In such embodiments, the air bridge 156 may have a thickness of up to a micron. In other embodiments, the air bridge 156 may have a different thickness. Although not shown, the pole 160 may have an anchor portion (not shown in FIG. 4A) on the opposite side of the ABS location as the remainder of the pole (e.g. on the left of FIG. 4A). Thus, although shown in FIG. 4A as being supported only at the right (e.g. the yoke) region, the pole 160 may be supported on both sides of the air bridge 156. Further, the nonmagnetic layer (not shown) in proximity to the sides of the pole 160 have been removed. Thus, the pole 160 and wet etch stop layer 158 and 162 appear to be floating in the ABS view of FIG. 4B.

Referring back to FIG. 3, the material(s) for the side shield are deposited, via step 108. In some embodiments, step 108 includes depositing seed layer(s). The soft magnetic material(s) for the side shield may be plated in step 108. These materials fill the region around the pole 160. Thus, the air bridge 156 is substantially filled as is the region adjacent to the sidewalls. In some embodiments, a full wrap around shield is plated in step 108. The back of the side shields fabricated in step 108 may be within twenty nanometers of the back of the air bridge 156. Fabrication of the transducer 150 may then be completed. For example, a portion of the pole 160 near the ABS may be removed to form a trailing edge bevel. A top, or trailing edge, shield may also be formed. Other components including but not limited to coil(s), a write gap, and a top shield may be formed.

FIGS. 5A-5B depict a magnetic transducer 150 during after formation is continued using the method 100. In particular, side and ABS views are shown in FIGS. 5A and 5B, respectively. For clarity, FIGS. 5A-5B are not to scale. The magnetic transducer 150 is shown after step 110 is performed. Thus, the side shield 164 has been fabricated. As can be seen in FIG. 5B, the side shield is continuous from the one side of the pole 160, to below the pole 160 and then to the opposite side of the pole 160.

Using the method 100, side shield 164 having the desired geometry may be fabricated. More specifically, the side shield 164 is continuous. Thus, the side shield 164 may be viewed as not having corners near the pole 160. Similarly, the interface between the leading shield 154 and the side shield 164 adjacent to the pole 160 has been removed. Thus, nucleation of fields due to corners of the side shield 164 may be reduced. Further, any interface between the side shield 164 and the lead shield layer 154 may be moved further from the pole 160 and improved in quality. Thus, performance of the transducer 150 may be improved.

Figure 6:
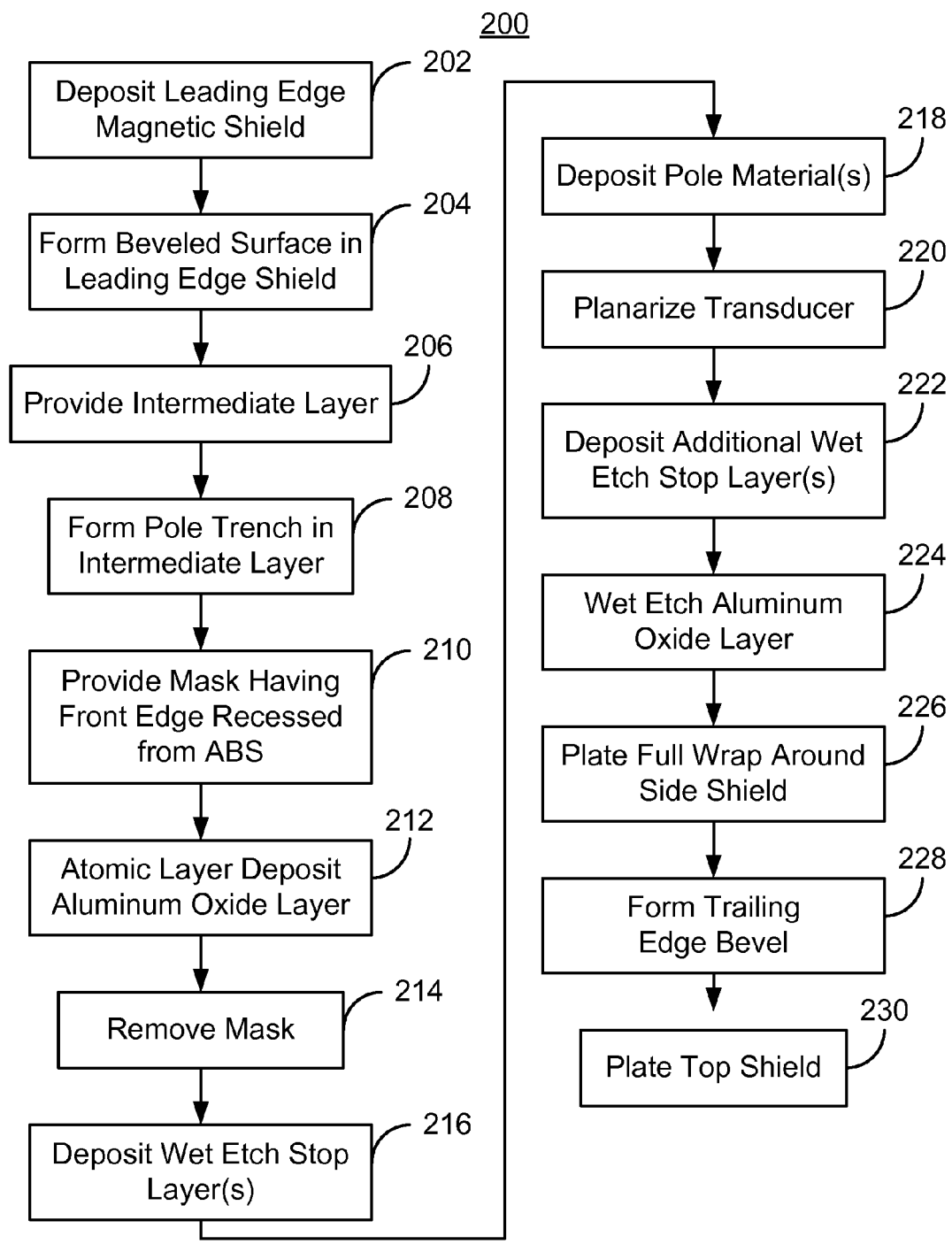
FIG. 6 is a flow chart depicting another exemplary embodiment of a method for fabricating side shields for a magnetic recording transducer.

FIG. 6 is a flow chart depicting another exemplary embodiment of a method 200 for fabricating a transducer using an air bridge. For simplicity, some steps may be omitted. FIGS. 7A-7C-FIGS. 18A-18C are diagrams depicting side, ABS location and plan views of an exemplary embodiment of a portion of a transducer during 250 fabrication. For clarity, FIGS. 7A-7C-FIGS. 18A-18C are not to scale. Although FIGS. 7A-7C-FIGS-18A-18C depict the ABS location (location at which the ABS is to be formed) and ABS at a particular point in the pole, other embodiments may have other locations for the ABS. Referring to FIGS. 6-18C, the method 200 is described in the context of the transducer 250. However, the method 200 may be used to form another device (not shown). The transducer 250 being fabricated may be part of a merged head that also includes a read head (not shown in FIGS. 7A-7C-FIGS. 18A-18C) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

A leading edge magnetic shield layer is deposited, via step 202. In some embodiments, step 202 includes depositing a NiFe shield layer on one or more other underlayers. In some embodiments, these underlayers include an alumina underlayer and at least one nonmagnetic layer on the alumina underlayer. In some embodiments, the nonmagnetic layer includes Ru. In some such embodiments, a Ti adhesion layer may be provided between the alumina underlayer and the leading shield layer. In embodiments in which a leading shield is omitted, step 202 may be skipped.

A beveled surface may be formed in the leading shield layer, via step 204. The beveled surface is formed by removing a portion of the leading edge magnetic shield layer distal from the ABS in step 204. Step 204 may include forming a hard mask in a region near the ABS location. In some embodiments, the hard mask resides on the leading shield layer at a location on the opposite side of the ABS location as the side at which the pole is developed. In some embodiments, the hard mask includes a trilayer of Ta/Ru/Ta that may also function as a stop layer. The hard mask may be formed by depositing the hard mask layers, forming a photoresist mask on the hard mask layers, and removing the exposed portion of the hard mask layers. The leading shield layer may then be removed to form the beveled surface, for example by ion milling at a nonzero angle from normal to the surface of the leading shield. FIGS. 7A-7C depict side, ABS and plan views of the transducer 250 after step 204 is performed. Thus, underlayers 251, 252, and 253 are shown. Also depicted is leading shield layer 254 having beveled surface 255. The hard mask 256 used is also shown.

A nonmagnetic intermediate layer having a top surface substantially perpendicular to the ABS location is provided, via step 206. In some embodiments, step 206 includes multiple substeps. For example, a nonmagnetic intermediate layer, such as aluminum oxide may be deposited. However, the deposition process may be conformal to the beveled surface 255. Thus, the top surface of the alumina may not be perpendicular to the ABS location (e.g. flat). A planarization such as a CMP may then be carried out and the hard mask 156 removed. Thus, the top surface of the intermediate layer and the leading shield layer 254 may be aligned. Another aluminum oxide layer may then be deposited. The two aluminum oxide layers may be considered to form a single, nonmagnetic intermediate layer. FIGS. 8A-8C depict side, ABS location, and plan views of the transducer 250 after step 206 is completed. Thus, intermediate layer 258 is shown. In some embodiments, the layer 25i is alumina and includes sublayers (not separately shown).

A pole trench is formed in the intermediate layer 258, via step 208. Step 208 may include depositing hard mask layer(s) and providing a photoresist mask on the hard mask layers. The photoresist mask includes an aperture having a location and width corresponding to the desired trench. The underlying hard mask may then be etched, forming an aperture in the hard mask. The intermediate layer may then be etched in the region under the aperture in the hard mask. Thus, a pole trench having a bottom, a top wider than the bottom, and a location corresponding to a pole is formed. A portion of the bottom of the pole trench in a pole tip region proximate to the ABS location being formed by the beveled surface of the leading edge magnetic shield layer. FIGS. 9A-9C depict the transducer after step 210 is performed. Thus, trench 262 is shown.

A mask having a front edge and covering a portion of the pole trench distal from the ABS location is provided, via step 210. The front edge of the mask is not more than 20 nm from a desired back edge of a full wrap around shield. FIGS. 10A-10C depict the transducer 250 after step 210 is performed. Thus, mask 264 is shown. The mask 264 covers a portion of the trench 262.

At least one wet etchable layer is deposited, via step 212. Step 212 may include depositing an aluminum oxide layer. In some embodiments, step 212 is performed using ALD. In some embodiments, step 212 includes deposition of a an adhesion layer. FIGS. 11A-11C depict side, ABS, and plan views of the transducer 250 after step 212 is performed. Thus, alumina layer 266 is shown. In some embodiments, a portion of the aluminum oxide layer 266 in the pole trench. Also shown is Ti adhesion layer 267 that may also be deposited. In other embodiments, Ti layer 267 may be omitted. Note that the location of the trench 262 is shown by a dotted line in FIG. 11C.

The mask 264 is removed, via step 214. At least one wet etch stop layer is also deposited, via step 216. In some embodiments, step 216 includes performing a CVD Ru deposition. FIGS. 12A-12C depict the transducer 250 after step 214 is performed. Thus, Ru layer 268 has been formed.

At least one pole material is deposited on the at least one wet etch stop layer, via step 218. The trench 264 is thus filled. FIGS. 13A-13C depicts side, ABS, and plan views of the transducer after step 218 is performed. Thus, material(s) 270 for the pole are shown.

The transducer is planarized, via step 220. Thus, a portion of the pole material(s) 270 shown is removed. FIGS. 14A-14C depicts side, ABS, and plan views of the transducer 250 after step 220 is performed. Thus, portions of the pole material 270 external to the trench are removed and a pole 270' is formed. The pole 270' has a plurality of sidewalls, a pole bottom, a pole top, and a pole tip portion. A portion of the pole 270' also resides in the pole tip region of the pole trench. The pole tip portion of the pole 270' residing on at least a first portion of the Ru etch stop layer 268. As can be seen in FIG. 14B, the pole top is wider than the pole bottom in at least the pole tip portion.

At least an additional wet etch stop layer is deposited, via step 222. In some embodiments, step 222 includes providing a mask having an aperture over the pole and then depositing the wet etch stop layer(s). FIGS. 15A-15C depict side, ABS, can plan views of the transducer 250 after step 222 is performed. In the embodiment shown, two layers 272 and 274 are shown. These layers 272 and 274 cover the top of the pole 270' and a portion of the wet etch stop layer 268 in the pole tip region. In the embodiment shown, a Ti adhesion layer 272 is also shown. However, in other embodiments, other materials may be used or the layer 272 may be omitted. Also shown is mask 273 that may be used in forming the additional wet etch layer 274. As can be seen in FIG. 15B, a combination of the wet etch stop layer(s) 268 and 274 substantially surround the sidewalls, the bottom, and the pole top in the pole tip region.

The aluminum oxide layer 266 and a second portion of the intermediate layer 258 are wet etched, via step 224. Thus, an air bridge is formed. FIGS. 16A-16D depict side, ABS, yoke, and plan views of the transducer 250 after step 224 is performed. An air bridge 276 is shown. The air bridge 276 is between at least the leading edge magnetic shield layer 254 and the wet etch stop layer 268 on which bottom of the pole tip portion of the pole 270' resides. Note, however, that the air bridge 276 extends only under a portion of the pole 270'. This may best be seen in FIG. 16A (side view) and a comparison of FIGS. 16B (ABS view) and 16C (view closer to the yoke).

A full wrap around side shield is plated, via step 226. FIGS. 17A-17C depicts side, ABS, and plan views of the transducer after step 26 is performed. Thus, a wraparound side shield 278 is shown. A portion of the full wrap around side shield 275 substantially fills the air bridge. In some embodiments, a trailing edge bevel may be formed, via step 228. Step 228 may include performing a planarization such as a CMP and removing a portion of the pole 260'. This removal may be accomplished by providing a mask covering a portion of the pole 270' distal from the ABS location and performing an ion mill. A top shield may then be plated, via step 230. FIGS. 18A-18B depict side and ABS views of the transducer 250 after step 230 is performed. Thus, a trailing edge bevel 280, gap layer 282 and top shield 284 are shown.

Thus, using the method 200, the transducer 250 may be fabricated. The transducer 250 shares the benefits of the transducer 150. A side shield 278 that is continuous and interface free below the pole 278 may be formed. Thus, performance of the transducer 250 may be improved.

We claim:

1. A write transducer having an air-bearing surface (ABS), the write transducer comprising:
    a leading edge magnetic shield having a sloped top surface distal from the ABS,
    a pole having a bottom, a top, a plurality of sidewalls, and a pole tip portion, the top being wider than the bottom in the pole tip portion;
    at least one nonmagnetic layer, a portion of the at least one nonmagnetic layer surrounding the bottom and sidewalls of the pole,
    a side shield substantially surrounding the portion of the at least one nonmagnetic layer such that the side shield substantially surrounds the bottom and sidewalls of the pole, a portion of the side shield resides between the pole and the leading edge magnetic shield, the side shield is interface-free between the pole and the leading edge magnetic shield and the side shield is interface-free adjacent to the sidewalls of the pole;
    a nonmagnetic gap layer adjacent to at least the top of the pole; and
    a trailing edge shield, at least a portion of the nonmagnetic gap layer being between the top of the pole and the trailing edge shield.

2. The write transducer of claim 1 wherein the side shield and trailing edge shield form a wraparound shield, the wraparound shield being interface free.

3. A disk drive comprising:
    a media;
    a slider including a write transducer and having an air-bearing surface (ABS), the write transducer including a leading edge magnetic shield, a pole, at least one magnetic layer, a side shield, a nonmagnetic gap layer and a trailing shield, the leading edge magnetic shield having a sloped top surface distal from the ABS, the pole having a bottom, a top, a plurality of sidewalls, and a pole tip portion, the top being wider than the bottom in the pole tip portion, a portion of the at least one nonmagnetic layer surrounding the bottom and sidewalls of the pole, the side shield substantially surrounding the portion of the at least one nonmagnetic layer such that the side shield substantially surrounds the bottom and sidewalls of the pole, a portion of the side shield resides between the pole and the leading edge magnetic shield, the side shield is interface-free between the pole and the leading edge magnetic shield and the side shield is interface-free adjacent to the sidewalls of the pole, the nonmagnetic gap layer being adjacent to at least the top of the pole, at least a portion of the nonmagnetic gap layer being between the top of the pole and the trailing edge shield.

* * * * *